(12) United States Patent
Jensen et al.

(10) Patent No.: US 8,892,611 B2
(45) Date of Patent: Nov. 18, 2014

(54) ASSIGNING DATA FOR STORAGE BASED ON SPEED WITH WHICH DATA MAY BE RETRIEVED

(75) Inventors: Craig Jensen, Clearwater, FL (US); Andrew Staffer, Sylmar, CA (US); Robert Stevens Kleinschmidt, Jr., Sunland, CA (US); Sopurkh Khalsa, Los Angeles, CA (US); Gary Quan, Glendale, CA (US)

(73) Assignee: Condusiv Technologies Corporation, Burbank, CA (US)

( * ) Notice: Subject to any disclaimer, the term of this patent is extended or adjusted under 35 U.S.C. 154(b) by 136 days.

(21) Appl. No.: 12/971,835

(22) Filed: Dec. 17, 2010

(65) Prior Publication Data

US 2011/0087657 A1    Apr. 14, 2011

Related U.S. Application Data

(63) Continuation of application No. 11/495,184, filed on Jul. 28, 2006, now Pat. No. 7,870,128.

(51) Int. Cl.
*G06F 17/30* (2006.01)
*G06F 3/06* (2006.01)

(52) U.S. Cl.
CPC ............ *G06F 17/3053* (2013.01); *G06F 3/067* (2013.01); *G06F 3/0644* (2013.01); *G06F 3/0643* (2013.01); *G06F 3/0613* (2013.01); *G06F 17/30554* (2013.01)
USPC ........... 707/821; 707/822; 707/823; 707/825; 711/100; 711/102; 711/103; 713/193; 713/324; 726/2

(58) Field of Classification Search
USPC .......... 707/821–823; 713/165, 187, 193, 324; 726/26, 27, 30
See application file for complete search history.

(56) References Cited

U.S. PATENT DOCUMENTS 4,467,421 A    8/1984    White
4,607,346 A    8/1986    Hill (Continued)

FOREIGN PATENT DOCUMENTS

EP    0 381 651 A    8/1990
JP    2001-243096    9/2001

(Continued)

OTHER PUBLICATIONS

"Notification of Transmittal of the International Search Report and the Written Opinion of the International Searching Authority, or the Declaration" received in International Application No. PCT/US12/20198 dated May 3, 2012 (14 pages).

(Continued)

*Primary Examiner* — Hanh Thai
(74) *Attorney, Agent, or Firm* — Christie, Parker & Hale, LLP

(57) ABSTRACT

A method, system, and apparatus for improving performance when retrieving data from one or more storage media. Files to be stored on the one or more storage media are classified into a ranking of different sets. Differences in retrieval value of different regions of the one or more storage media are exploited by selecting which files to store in which regions. For example, files that have a higher classification are stored in regions with faster retrieval values. The files can be classified based on frequency of access. Thus, files that are more frequently accessed are stored in regions that have a faster retrieval value. The files can be classified by another measure such as priority. For example, the classification for some or all of the files can be based on user-assigned priority. The classification may be based on events or data grouping.

48 Claims, 6 Drawing Sheets

(56) References Cited

U.S. PATENT DOCUMENTS

| | | | |
|---|---|---|---|
| 5,353,430 A * | 10/1994 | Lautzenheiser | 711/117 |
| 5,379,424 A | 1/1995 | Morimoto et al. | |
| 5,398,142 A | 3/1995 | Davy | |
| 5,475,545 A | 12/1995 | Hampshire et al. | |
| 5,590,300 A * | 12/1996 | Lautzenheiser | 711/202 |
| 5,592,622 A * | 1/1997 | Isfeld et al. | 709/207 |
| 5,594,885 A * | 1/1997 | Lautzenheiser | 711/133 |
| 5,615,353 A * | 3/1997 | Lautzenheiser | 711/136 |
| 5,790,886 A | 8/1998 | Allen | |
| 5,854,941 A | 12/1998 | Ballard et al. | |
| 5,893,139 A | 4/1999 | Kamiyama | |
| 6,023,706 A | 2/2000 | Schmuck et al. | |
| 6,032,224 A | 2/2000 | Blumenau | |
| 6,046,933 A * | 4/2000 | Nobukata et al. | 365/185.03 |
| 6,098,128 A | 8/2000 | Velez-McCaskey et al. | |
| 6,175,899 B1 * | 1/2001 | Baylor et al. | 711/144 |
| 6,192,481 B1 * | 2/2001 | Deenadhayalan et al. | 713/324 |
| 6,199,150 B1 | 3/2001 | Yoshikawa | |
| 6,378,042 B1 * | 4/2002 | Henderson et al. | 711/128 |
| 6,397,346 B1 * | 5/2002 | Cavanaugh et al. | 714/4.1 |
| 6,535,891 B1 | 3/2003 | Fisher et al. | |
| 6,605,839 B2 * | 8/2003 | Miura et al. | 257/314 |
| 6,649,542 B2 * | 11/2003 | Miura et al. | 438/791 |
| 6,760,918 B2 | 7/2004 | Rodriguez et al. | |
| 6,848,019 B1 | 1/2005 | Mobley et al. | |
| 6,904,496 B2 * | 6/2005 | Raves et al. | 711/113 |
| 6,957,237 B1 * | 10/2005 | Traversat et al. | 1/1 |
| 6,965,989 B1 * | 11/2005 | Strange et al. | 713/1 |
| 7,092,977 B2 | 8/2006 | Leung et al. | |
| 7,191,304 B1 | 3/2007 | Cameron et al. | |
| 7,254,667 B2 * | 8/2007 | Tran et al. | 711/100 |
| 7,296,258 B2 * | 11/2007 | Beckert et al. | 717/127 |
| 7,370,068 B1 * | 5/2008 | Pham et al. | 1/1 |
| 7,496,917 B2 * | 2/2009 | Brokenshire et al. | 718/100 |
| 7,536,504 B2 | 5/2009 | Kleinschmidt, Jr. et al. | |
| 7,797,503 B1 * | 9/2010 | Thakur et al. | 709/216 |
| 7,801,973 B1 * | 9/2010 | Thakur et al. | 709/219 |
| 7,805,571 B2 | 9/2010 | Kirshenbaum et al. | |
| 7,814,554 B1 * | 10/2010 | Ragner | 726/27 |
| 7,844,582 B1 * | 11/2010 | Arbilla et al. | 707/694 |
| 7,870,128 B2 | 1/2011 | Jensen et al. | |
| 7,895,295 B1 * | 2/2011 | Thakur et al. | 709/219 |
| 7,899,987 B2 | 3/2011 | Salomon et al. | |
| 2001/0013084 A1 | 8/2001 | Barve et al. | |
| 2001/0029512 A1 | 10/2001 | Oshinsky et al. | |
| 2001/0034812 A1 | 10/2001 | Ignatius et al. | |
| 2002/0073290 A1 | 6/2002 | Litvin | |
| 2002/0133746 A1 * | 9/2002 | Chen et al. | 714/13 |
| 2002/0152372 A1 * | 10/2002 | Cole et al. | 713/2 |
| 2003/0005454 A1 | 1/2003 | Rodriguez et al. | |
| 2003/0076764 A1 | 4/2003 | Iwano et al. | |
| 2003/0086570 A1 | 5/2003 | Riedel et al. | |
| 2003/0121055 A1 | 6/2003 | Kaminski et al. | |
| 2003/0200400 A1 | 10/2003 | Nangle | |
| 2003/0217245 A1 | 11/2003 | Chase et al. | |
| 2003/0221064 A1 | 11/2003 | Honda et al. | |
| 2003/0226059 A1 * | 12/2003 | Braun | 714/20 |
| 2004/0019613 A1 | 1/2004 | Jones et al. | |
| 2004/0059758 A1 | 3/2004 | Faiman et al. | |
| 2005/0060356 A1 | 3/2005 | Saika | |
| 2005/0066139 A1 | 3/2005 | Inoue et al. | |
| 2005/0125456 A1 | 6/2005 | Hara et al. | |
| 2005/0129020 A1 * | 6/2005 | Doyle et al. | 370/392 |
| 2005/0165796 A1 | 7/2005 | Moore | |
| 2005/0172074 A1 * | 8/2005 | Sinclair | 711/114 |
| 2005/0240742 A1 | 10/2005 | Eng et al. | |
| 2006/0090031 A1 * | 4/2006 | Kirshenbaum et al. | 711/113 |
| 2006/0112251 A1 | 5/2006 | Karr et al. | |
| 2006/0149890 A1 | 7/2006 | Gorobets | |
| 2006/0274566 A1 | 12/2006 | Takashima et al. | |
| 2006/0274577 A1 * | 12/2006 | Pascucci et al. | 365/185.17 |
| 2007/0022145 A1 * | 1/2007 | Kavuri | 707/204 |
| 2007/0033362 A1 * | 2/2007 | Sinclair | 711/165 |
| 2007/0033367 A1 | 2/2007 | Sakarda et al. | |
| 2007/0043789 A1 * | 2/2007 | Cannon et al. | 707/203 |
| 2007/0079065 A1 | 4/2007 | Bonella et al. | |
| 2007/0083491 A1 * | 4/2007 | Walmsley et al. | 707/3 |
| 2007/0106864 A1 | 5/2007 | Moore et al. | |
| 2007/0136308 A1 | 6/2007 | Tsirigotis et al. | |
| 2007/0143567 A1 | 6/2007 | Gorobets | |
| 2007/0150891 A1 * | 6/2007 | Shapiro | 717/174 |
| 2007/0156998 A1 | 7/2007 | Gorobets | |
| 2007/0174582 A1 | 7/2007 | Feldman | |
| 2007/0186070 A1 * | 8/2007 | Federa et al. | 711/163 |
| 2008/0016297 A1 * | 1/2008 | Bartley et al. | 711/159 |
| 2008/0027905 A1 | 1/2008 | Jensen et al. | |
| 2008/0028142 A1 | 1/2008 | Kleinschmidt et al. | |
| 2009/0132621 A1 | 5/2009 | Jensen et al. | |
| 2009/0138880 A1 * | 5/2009 | Yafimau | 718/103 |
| 2009/0157756 A1 | 6/2009 | Sanvido | |
| 2009/0172340 A1 | 7/2009 | Tang et al. | |
| 2011/0087657 A1 | 4/2011 | Jensen et al. | |
| 2011/0167230 A1 | 7/2011 | Quan et al. | |
| 2011/0258186 A1 | 10/2011 | Jensen et al. | |

FOREIGN PATENT DOCUMENTS

| | | |
|---|---|---|
| JP | 2002-073383 | 3/2002 |
| JP | 2005-196725 | 7/2005 |
| TW | 409215 | 10/2000 |
| WO | WO 2004/066277 | 8/2004 |
| WO | WO 2004/109517 | 12/2004 |

OTHER PUBLICATIONS

PCT Current Claims in International Application No. PCT/US12/20198 dated May 2012 (2 pages).

Harding, W. et al., "Object Storage Hierarchy Management" *IBM Systems Journal* 1990 (12 pages).

European Office Action received in Application No. 09700908.8 dated Oct. 6, 2011 (10 pages).

Current Claims of European Application No. 09700908.8 dated Oct. 2011 (6 pages).

Harding, W., "Object Storage Hierarchy Management," IBM Systems Journal, IBM Corp., Armonk, New York, US, vol. 29, No. 3, Dated Jan. 1, 1990, 14 pages.

Hsu et al.; "The Performance Impact of I/Q Optimizations and Disk Improvements", IBMJ. Res. & Dev., Mar. 2004, vol. 48, No. 2, pp. 255-289.

International Search Report and Written Opinion for International Application No. PCT/US2009/030567, dated Apr. 1, 2009, 17 pages.

Kakihara, T. et al.; "Optimized Look-Ahead Extension on Sequential Access", IBMJ Technical Disclosure Bulletin, Nov. 1996, vol. 19, No. 11, pp. 61-62.

Kanamaru, M. et al.; "Head Hovering to Reduce Seek Time", IBM Technical Disclosure Bulletin, Jun. 1995, vol. 38, No. 06, pp. 301-302.

Ritchie, B.; Beyond HSM: Data Management in the Native Environment. Integration into the native environment is the key to implementing an effective data management solution Computer Technology Review, Westworld Production, Los Angeles Hills, CA USA, vol. 12, No. 11, XP000397478, Sep. 1, 1993, 4 pages.

Japanese Office action issued on Mar. 19, 2013 in corresponding Japanese Application No. 2010-542369, 4pp.

Final Rejection Office action mailed Jul. 9, 2013 in corresponding Japanese Patent Application No. 2010-542369, 7pp.

* cited by examiner

ASSIGNING DATA FOR STORAGE BASED ON SPEED WITH WHICH DATA MAY BE RETRIEVED

CROSS-REFERENCE TO RELATED APPLICATIONS; BENEFIT CLAIM

This application claims the benefit as a Continuation of application Ser. No. 11/495,184, filed Jul. 28, 2006, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to accessing data on one or more storage media. In particular, the present invention relates to improving performance when reading one or more storage media by assigning locations for stored files based on a file classification and retrieval value of the data associated with particular regions of the one or more storage media.

BACKGROUND

For many different types of storage media, the speed with which data may be retrieved varies depending upon where the data is stored on the storage medium. For example, with hard disk drives the retrieval value varies based on physical factors such as seek time, rotational delay, and disk transfer rate. Examples of other storage media for which retrieval value differs based on where the data is stored include, hybrid drives (storage media have rotating platters as well as a solid state component such as a flash component that can store data), and network attached storage such as iSCSI. The retrieval value may be affected by factors other than the physical characteristics of the storage medium, such as the communication link, or network (if used).

Many manufactures of storage media provide information that roughly describes how fast the storage media will provide data. For example, a manufacturer may provide an "average access time". In practice, the term "average access time" is used to describe how fast a storage medium is. A storage medium with a lower average access time is generally more responsive and "peppier" than one with a higher average access time. But "average access time" is just an average for the whole storage medium. The results may vary for individual accesses to data stored in different locations on that same storage medium. Moreover, manufacturers may quote internal disk transfer rates (the rate that data can be written to or read from the disk) as a range of values. For example, a range might be a minimum of 43 Mbytes per second and a maximum of 78 Mbytes per second. However, the actual transfer rate at any particular place on the disk may be anywhere between the two extremes.

Thus, the actual speed with which data can be read from a storage medium is difficult or impossible to know based solely on manufacturer specifications. Moreover, factors external to the storage medium affect the rate at which data can be retrieved from a storage medium. For example, if a host computer system is connected to one storage medium via a network ("network storage medium") and another directly via a SCSI cable ("SCSI storage medium"), the retrieval value for the network storage medium may on average be slower than the SCSI storage medium. However, some regions of the network storage medium may have a faster retrieval value than some regions of the SCSI storage medium.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
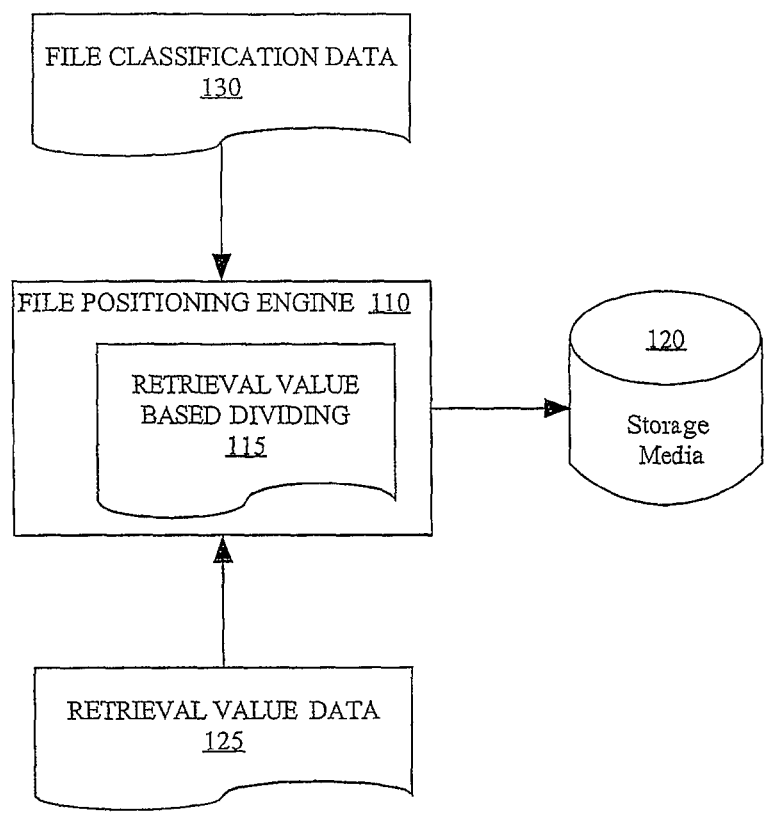
FIG. 1A is a diagram that illustrates an architectural overview of file positioning, in accordance with a first embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, system, and apparatus are described herein for improving performance when reading one or more storage media. Files to be stored on the one or more storage media are classified into a ranking of different sets. The term file, as used throughout this description, is used to mean a file or a portion of a file. Differences in retrieval values of the data, based on where the data is stored on one or more storage media are exploited by selecting which files to store in which regions. By "retrieval value" of a particular location on a storage medium it is meant a time or other value that represents the time it takes to retrieve data from the particular location on the storage medium. As an example, retrieval values may be determined by measuring the difference between the time at which a host process issues a command to access data from a storage medium and the time at which the data is available to the host process. Thus, the retrieval value may factor in the time to transfer data and commands between a host computer system and the storage medium. However, retrieval values can be determined in other ways. For example, in some circumstances a retrieval value could be the difference between the time at which the storage medium receives a command to read data at a particular location and the time at which the storage medium outputs data for the location.

The retrieval value may be a value that approximates the time it takes to retrieve data from the storage medium. However, the retrieval value could be a relative ranking between two regions. For example, it could be determined that data can be retrieved faster from region 1 than region 2, without determining or estimating a time to retrieve data for either region.

Files that have a higher classification are stored in a region that is characterized by a higher retrieval value. The files can be classified based on frequency of access. Thus, files that are more frequently accessed may be stored in a region that has a faster speed of retrievability. The files can be classified by another measure, such as priority. For example, the classification for some or all of the files can be based on user-assigned priority. Other ways in which files can be classified include events, such as a system boot. A still further way in which files can be classified is data grouping. An example of data grouping is storing the files in a manner that reflects the way they appear in a folder on the host computer system.

In accordance with an embodiment of the present invention, a retrieval value for each of a plurality of locations of the one or more storage media is accessed. A classification is formed for files that are currently stored or may be stored on the one or more storage media in the future. For example, files may be classified based on frequency of access. At least some of the files are stored on the one or more storage media based on the classification and the retrieval value of the locations. The storing of the files may include moving a particular file from a location having a given retrieval value to another location having a different retrieval value, or storing to the one or more storage media a file that does not currently exist on the one or more storage media.

In accordance with one embodiment, the one or more storage media is divided into regions according to the retrieval values. A particular region comprises one or more of the locations. The regions are ranked based on the retrieval value for the locations of each particular region. For example, one of the regions may be characterized as a fast region because the locations in that region have fast retrieval time. Another of the regions may be characterized as a slow region because the locations in that region have slow retrieval time. The files are stored in one of the regions, based on the ranking of the regions and the classification of the files. For example, files that are accessed more frequently are stored in the fast region.

Architectural Overview

FIG. 1A is a diagram that illustrates an architectural overview of file positioning, in accordance with a first embodiment of the present invention. The retrieval value data 125 describes retrieval value characteristics of the one or more storage media 120. The retrieval value is based, at least in part on, an internal disk transfer rate, in accordance with an embodiment of the present invention. As used throughout this description, the term "internal disk transfer rate" means the rate at which a hard disk drive can transfer data between the platters and the hard disk's controller. However, the retrieval value may be based on other factors, as well. For example, the retrieval value may be based on access time and factors external to the storage medium. As used throughout this description, the term "access time" means the time from when a command to access the storage medium is received by the storage medium until the storage medium is ready to read the data from the storage medium. External factors include, but are not limited to, communication links, networks (LANs, WANs, Internet, etc.), host overhead. The retrieval value data 125 may have a table with a column for location and a column for retrieval time. The location can be expressed as a logical cluster number (LCN). This LCN may correspond to multiple sectors of the one or more storage media 120. The location might be on a platter of a hard disk drive, but could be another location. For example, some storage media have rotating platters as well as a solid state component such as a flash component that can store data.

The file positioning engine 110 generates retrieval time based dividing data 115, based on the retrieval time data 125. The retrieval time based dividing data 115 describes how the one or more storage media 120 is logically divided into regions that are characterized by different retrieval values. The storage medium retrieval value is not necessarily uniform in a given region. For example, a particular storage medium might have 20 or more different retrieval values, but the storage medium might only be logically divided into three or four regions. Thus, there is not necessarily a single storage medium retrieval value for a particular region. However, the various regions can be characterized by the fastest or slowest storage medium retrieval value in the region or some statistical measure such as mean or medium storage medium retrieval value. The regions can then be ranked from a region characterized by the fastest storage medium retrieval value to a region characterized by the slowest storage medium retrieval value.

The retrieval time based dividing might also define a single region with a continuum of storage medium retrieval values. This region may be characterized as having a first point with a fast storage medium retrieval value and a second point with a slow storage medium retrieval value, with storage medium retrieval values decreasing between the first point and the second point.

The file positioning engine 110 accesses retrieval time data 125 and the file classification data 130 in order to determine where files should be stored on the one or more storage media 120. The file classification data 130 may describe how frequently each file is accessed. The frequency may be broken down by how often the file was accessed over different periods of time. For example, file classification data 130 may describe the number of accesses over the last week, the number of accesses over the last month, etc. The file classification data may also describe a relative priority of files. For example, a user or software program may assign a priority to files. As a particular example, files of a certain type or associated with a given folder may be assigned a high priority. The file classification data may also be based on events. Still a further way to classify files is based on data grouping. Moreover, files can be classified based on any combination of access frequency, events, data grouping, or other factors.

Figure 1B:
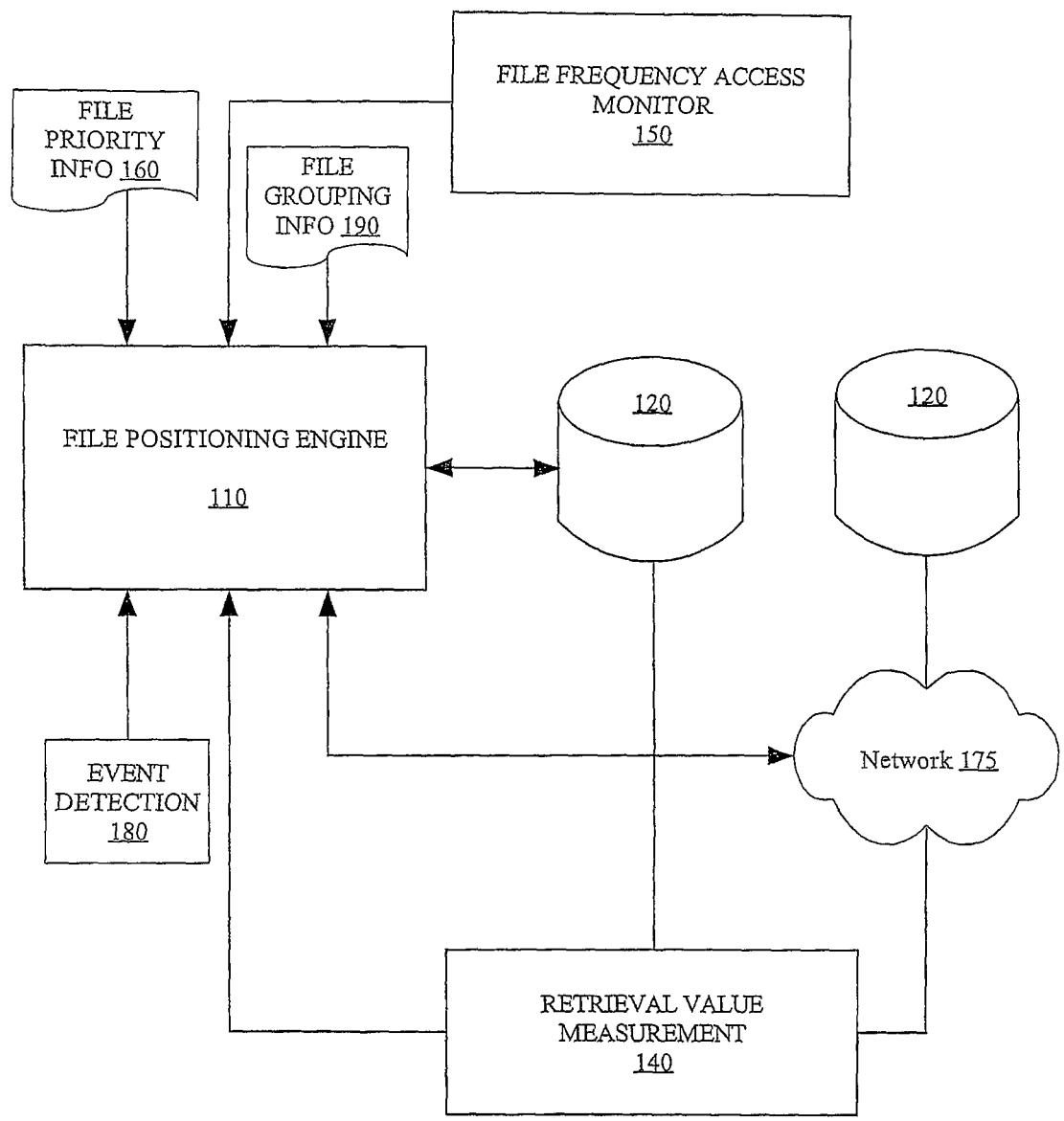
FIG. 1B is a diagram that illustrates an architectural overview of file positioning, in accordance with a second embodiment of the present invention.

FIG. 1B is a diagram that illustrates an architectural overview of file positioning, in accordance with a second embodiment of the present invention. The retrieval value measurement component 140 determines the retrieval values of various regions of the one or more storage media 120. In FIG. 1B, one of the storage media is depicted as accessible via network 175. The network 175 includes, but is not limited to Local Area Networks LANs, Wide Area Networks (WANs), and the Internet. Thus, the retrieval value measurement component 140 determines the affect the network 175 has on retrieval values, in this embodiment.

The file frequency access monitor 150 determines frequency of file accesses and provides file frequency access information to the file positioning engine 110. The file priority information 160 describes a priority given to one or more of the files. For example, a user may assign a priority to a file or group of files. The file positioning engine 110 inputs the file priority information. The event detection 180 detects events that may be used by the file positioning engine 110 to classify files. The file grouping information 190 is input to the file positioning engine 110. Based on the file frequency access information, events, file groupings and/or the file priority information, the file positioning engine 110 classifies the files. Based on the file classification and the retrieval time information, the file positioning engine 110 determines where to place files on the one or more storage media 120.

Process Flow

Figure 2:
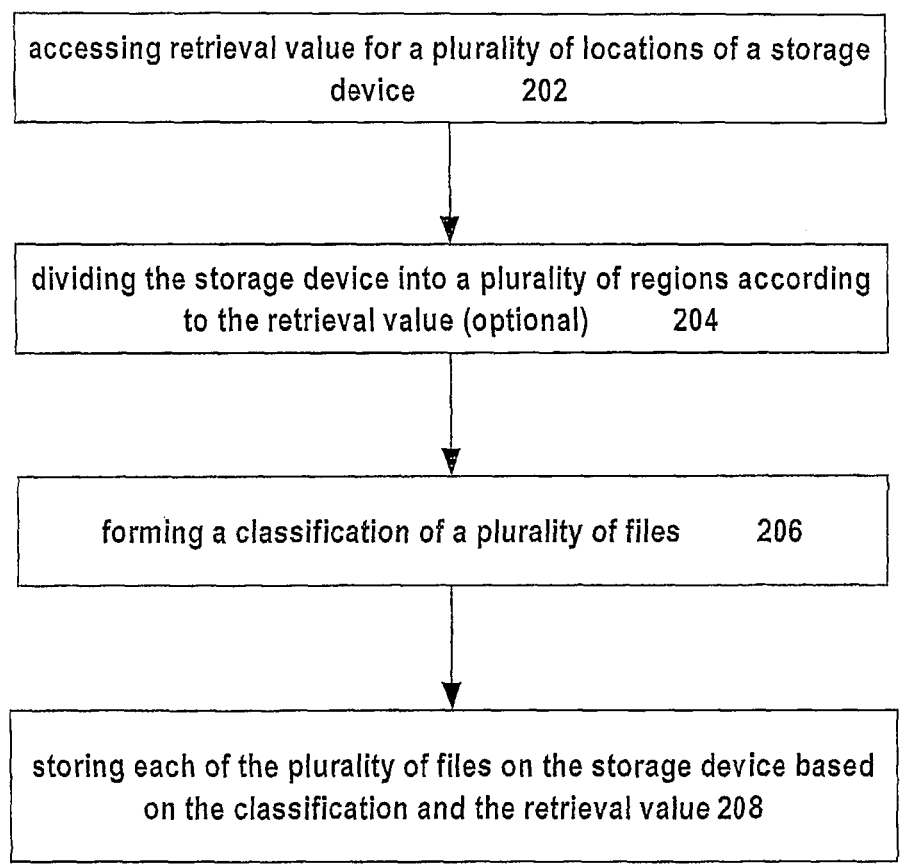
FIG. 2 is a flowchart illustrating steps of a process of determining positioning for files on one or more storage media, in accordance with an embodiment of the present invention.

FIG. 2 is a flowchart illustrating steps of a process 200 of determining positioning for files on one or more storage media, in accordance with an embodiment of the present invention. Process 200 will be described with reference to various components in the architectures of FIG. 1A and FIG. 1B. However, process 200 is not limited to either architecture. In step 202, a retrieval value is accessed for a number of different locations of one or more storage media. In one embodiment, the retrieval value is measured for various locations.

In one embodiment, the retrieval time is determined by a process on a host computer system issuing read commands to various locations on the one or more storage media and determining a value that represents the time to retrieve data from particular storage locations. However, a different technique may be used to determine retrieval times. Note that the retrieval time is not necessarily a time invariant. For example, if the storage medium is accessed via a network, then the retrieval time may be affected by network traffic. The retrieval time is determined based on on-going monitoring of network traffic, in one embodiment.

The retrieval time takes into account substantially all the factors that may be involved in the retrieval time of a particular storage medium, in one embodiment. For example if a volume is made up of several network attached storage devices, the network speed and latency is automatically included in the retrieval time (for example iSCSI). The solid state portion of a hybrid drive's retrieval times can also be determined in relation to its traditional rotating platter.

In one embodiment, internal disk transfer rate information is collected or determined. Retrieval value is affected by internal disk transfer rate. However, it is not necessary to determine or know the internal transfer rate to determine the retrieval value. If a storage medium were to provide internal disk transfer rate information in response to a request to the storage medium, a request for the internal disk transfer rate information can be sent to the storage medium. However, the storage medium may not provide such information via a request. In one embodiment, the internal disk transfer rate information is determined by issuing multiple read commands to the storage medium and measuring response time. A technique for determining internal disk transfer rate is described in U.S. Patent Application entitled "Online Storage Medium Transfer Rate Characteristics Determination", to Kleinschmidt Jr. et al., Ser. No. 11/495,177, filed on Jul. 28, 2006, and incorporated by reference in its entirety as if fully set forth herein. The internal disk transfer rate information may be accessed from a table that describes storage medium transfer rates characteristics for one or more different storage media. For example, storage medium transfer rate characteristics may be obtained for different hard disk drive manufactures/models in any fashion. These internal disk transfer rate characteristics can be stored in a table that is accessible to the file positioning engine, wherein step 202 comprises accessing such a table.

Step 204 is the optional step of logically dividing the storage medium into regions according to the retrieval values. Each particular region comprises one or more of the locations, and the regions are ranked based on the retrieval value for the locations of each particular region. For example, the storage medium might be divided into a region having locations with fast retrieval values, a region having locations with medium retrieval values, and a region having locations with slow retrieval values. The storage medium can be logically divided into any number of regions. In one embodiment, rather than dividing the storage medium into a number of regions, the storage medium is defined having a range of retrieval values from a fast retrieval value to a slow retrieval value. Thus, a single region of the storage medium can be defined to have a continuum of retrieval values.

In general, the storage medium is logically divided into n-regions based on retrieval values. For illustrative purposes, the following example of logically dividing the storage medium into three regions will be used to discuss process 200. However, the storage medium can be logically divided into fewer or greater number of regions.

Region 1—A region characterized by a fast retrieval value.
Region 2—A region characterized by a medium retrieval value.
Region 3—A region characterized by a slow retrieval value.

Step 206 is forming a classification of files that are to be stored on the storage medium or are already stored thereon. Process 300 of FIG. 3 describes one way of classifying or categorizing files. In process 300, files are classified into three categories: frequently accessed (hot), less frequently accessed (cold), and not accessed within the measurement period (frozen). Process 200 is not limited to using these categories. In one embodiment, a fourth category is used for a file which came into existence after the start of the measurement period (new file).

Step 208 is storing the files on the storage medium based on the classification and the retrieval values of the various locations of the storage medium. Continuing with the example in which three regions are used, files that are categorized as hot are placed into Region 1. Therefore, the files that are frequently accessed are placed in a region with a fast retrieval value. Files that are categorized as frozen are placed in Region 3. Therefore, the files that are infrequently accessed are placed in a region with a slow retrieval value. Files that are categorized as cold need not be moved at all except when they must be moved to free up space in region 1, in which case a cold file is placed in Region 2. Therefore, the files that are less frequently accessed tend to be placed in a region with a medium retrieval value.

Example of Categorizing Files

Figure 3:
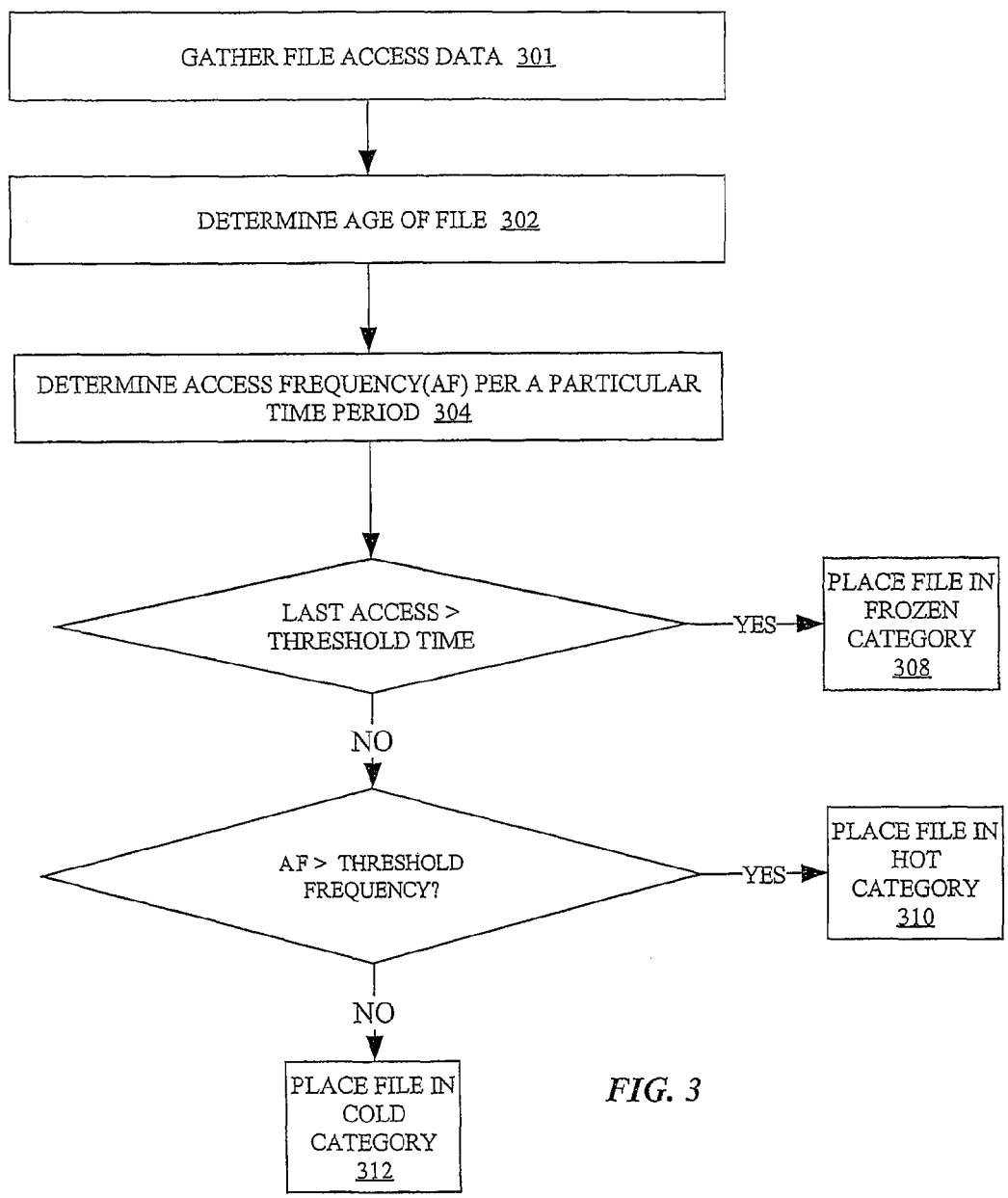
FIG. 3 is a flowchart illustrating steps of a process of categorizing files by frequency of access and age, in accordance with an embodiment of the present invention.

FIG. 3 is a flowchart illustrating steps of a process 300 of categorizing files by frequency of access and age, in accordance with an embodiment of the present invention. The ordering of the steps is for convenience of explanation. Process 300 illustrates a way to place files into three categories, but more or fewer categories could be used. In step 301, file access data is gathered. The gathering of file access data is then suspended prior to proceeding with further steps of process 300.

In step 302, the age of a particular file is determined, based on the file access data or otherwise. In step 304, the frequency of access per a particular time period for the particular file is determined by examining the file access data. For example, the number of times the file was accessed in the last week is determined. However, other time periods can be used.

The time of the last file access is examined to determine if the file is a frozen file. If the last file access occurred more than a threshold time in the past, then the file is placed into a category as a frozen file, in step 308. For example, if the last file access was more than one month in the past, the file is considered frozen.

If the file is not a frozen file, then the number of file accesses over a period of time is analyzed. If the file was accessed more than a threshold number of times over the time period, then the file is placed into a category as a hot file, in step 310. As an example, a hot file is one that has been accessed more than a particular number of times in the last week.

If the file was accessed less than the threshold number of times over the first time period, then the file is placed into a category as a cold file, in step 312. A cold file is, for example, a file that has been accessed less than the threshold number of times within the last week.

Figure 4:
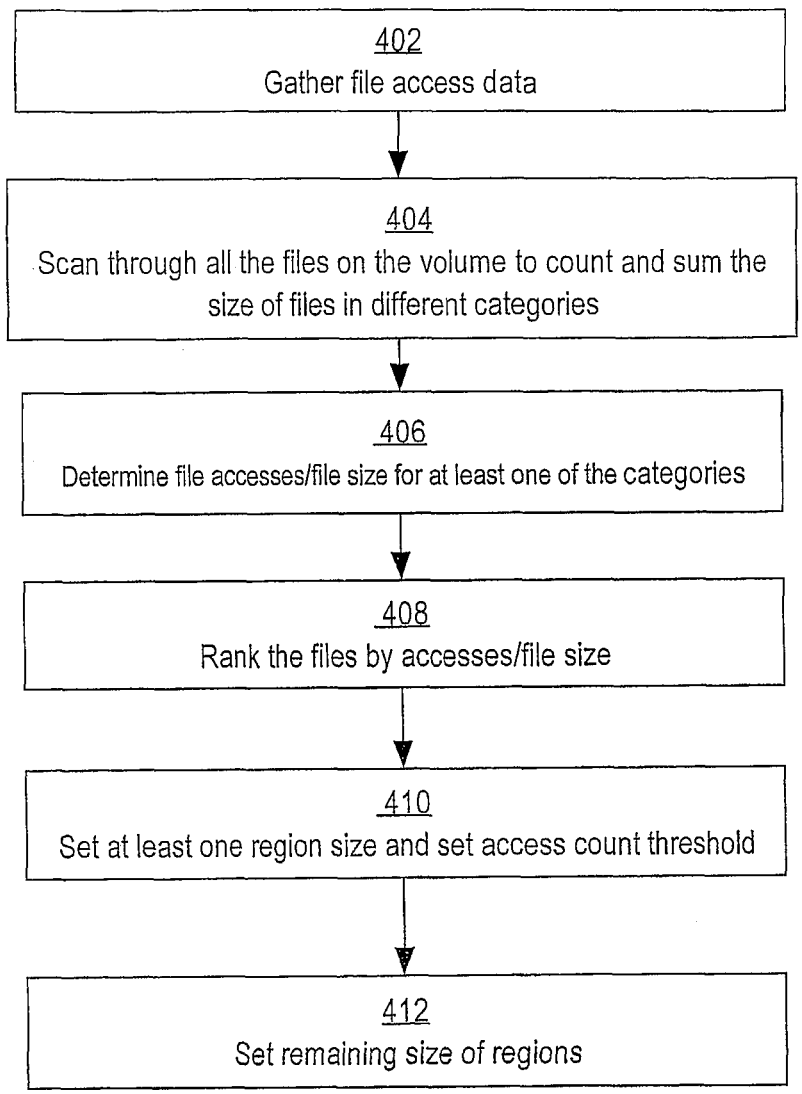
FIG. 4 depicts a process of setting the size of each volume region and access frequency criteria, in accordance with an embodiment of the present invention.

Process 300 refers to various time periods and thresholds. These time periods and thresholds may be dynamically adjusted. Process 400 of FIG. 4 describes a technique that involves establishing a threshold for placing files in the hot or cold category.

Classifying files based on access frequency is an example of one way of classifying files. However, this is not the only way in which files can be classified. Another way to classify files is based on events. Still a further way to classify files is based on data grouping. Moreover, files can be classified based on any combination of access frequency, events, data grouping, or other factors.

Classifying Files Based on Events

An example of an event is a system boot. In order to increase boot time performance of a computer system, files required for booting can be placed on a fast part of the storage medium during shutdown. The files are then in the fast or instant part of the storage medium for the boot event. Once the system is booted the files may be moved to make room for other more pertinent files while the system is up and running. Certain executables can also be thus placed on the fast portion of the storage medium. For example, a frequently-used word processing program or other data processing program can be placed in the fast portion of the storage medium. Rapid launching of such programs makes the computer system faster and more responsive to its users.

Classifying Files Based on Data Grouping

Grouping of files or parts of files together on a certain area of the storage medium can also significantly increase performance. For example if you launch a word processor, several different files and/or potions of files are loaded, additionally data may also be loaded at launch. If the computer has to go to several different areas of the disk to load the necessary files or parts of files it will take substantially longer than if all these files were in the same area on this disk. Further grouping folders (directories) with the files they contain will also speed up the computer system under certain circumstances. In order to determine what files to group we merely kept track of what files are read from the disk in sequence. When we can confirm a pattern then those files or portions of files are grouped together.

File Access Monitoring

A File Access Monitor (FAM) is used to track the access frequency of each file on a storage medium volume, in accordance with one embodiment of the present invention. This is done in the background on a computer, in real time, while the computer is being used for work, without adversely impacting that work. As an example, the FAM can provide the number of accesses that have occurred for any file on the system during the last day, the last week, the last two weeks, three weeks or four weeks.

The FAM has an extremely efficient storage method for the access information. This method uses each file's File Record Number as an index into the data store. Any file's record can be accessed using its FRN or the records for all files can be accessed sequentially without requiring the overhead of record searches or maintaining index lists. These storage methods allow the FAM to work in the background without impacting other system processes.

The FAM uses small, fixed length records that are a whole power of two in length, in accordance with one embodiment of the present invention. This allows the access methods previously mentioned to be used without requiring time consuming index calculations or requiring logic to handle records that span buffers, and it keeps the size of the storage manageable. Daily and weekly access counts are stored in each record, in one embodiment. Moreover, the data is effectively aged as time passes, without requiring that the data be processed daily or weekly. This is done by recording a timestamp in each record. When a record is accessed, the current time and the recorded timestamp are used to ripple the data through the day and week counters so it reflects the state at that time, and then the timestamp is updated with the current time.

The FAM contains a method to detect file accesses in real-time on an ongoing basis for any volume on the computer. This method uses a high priority thread that repeatedly and continuously requests information on changes in the directories of a target volume. Any such information received by the thread is queued to a lower priority thread for recording as described above. The high priority thread handles its processing actions very quickly. Using quick processing and high priority allows each monitoring thread to capture information about any and all file accesses while not impacting other processes on the computer.

Hardware Overview

Figure 5:
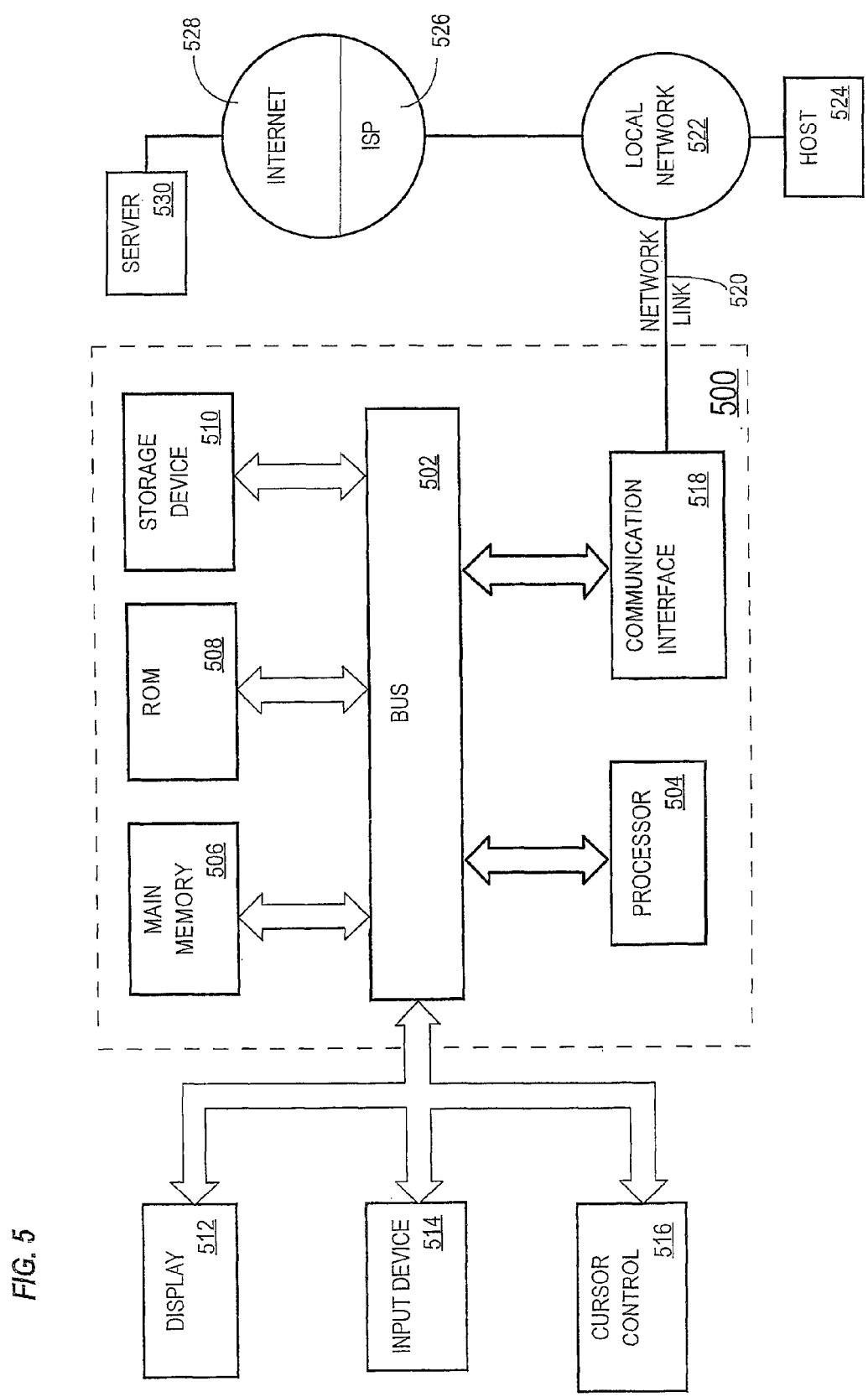
FIG. 5 is a block diagram that illustrates a computer system upon which an embodiment of the invention may be implemented.

FIG. 5 is a block diagram that illustrates a computer system 500 upon which an embodiment of the invention may be implemented. Steps of process 300 and process 400 are stored as instructions one or more of the computer-readable media of system 500 and executed on the processor of computer system 500. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions. The computer system 500 can have any number of processors 504. For example, computer system 500 is a multi-processor system, in one embodiment. The processor 504 can have any number of cores. In one embodiment, the processor 504 is a multi-core processor 504. Computer system 500 can be used in a hyper threaded machine.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    during and in response to a shutdown procedure of a computer system:
        storing, at a first memory location, data that is (a) stored at a second memory location and (b) to be used during a next boot up procedure of the computer system;
        wherein the first memory location is faster than the second memory location;
        wherein the first memory location and the second memory location are non-volatile memory locations; and
    during the next boot up procedure of the computer system, accessing the data stored at the first memory location.

2. The method as recited in claim 1, wherein the step of storing the data at the first memory location is performed in response to receiving a command for executing the shutdown procedure of the computer system.

3. The method as recited in claim 1, further comprising:
    subsequent to accessing the data stored at the first memory location during the next boot up procedure of the computer system, over-writing the data stored at the first memory location.

4. The method as recited in claim 1, further comprising:
    subsequent to accessing the data stored at the first memory location during the next boot up procedure of the computer system, moving the data stored at the first memory location to another memory location different than the first memory location.

5. The method as recited in claim 1, wherein the first memory location is located on a solid state drive.

6. The method as recited in claim 1, wherein storing the data at the first memory location comprises transferring the data from the second memory location to the first memory location.

7. The method of claim 1, wherein the first memory location and the second memory location are the same type of medium.

8. The method of claim 7, wherein the first memory location and the second memory location are on the same medium.

9. The method of claim 1, wherein the first memory location is selected for storing the data based on a determination that the first memory location is faster than the second memory location.

10. The method of claim 1, wherein the data is executable code used during the next boot up procedure.

11. The method of claim 10, wherein the executable code is loaded, from the first memory location, into volatile memory for execution during the next boot up procedure.

12. A method comprising:
    assigning a classification to data based on a type of event that involves the data;
    prior to occurrence of an event of said type, preparing for the occurrence of the event by:
        based on the classification, storing, at a first memory location, the data that is (a) currently stored at a second memory location and (b) to be used during the event;
        wherein the first memory location is faster than the second memory location;
        wherein the first memory location and the second memory location are non-volatile memory locations; and
    performing the event at least in part by accessing the data stored at the first memory location;
    wherein the method is performed by a computer system.

13. The method as recited in claim 12, wherein the event comprises execution of a program and wherein the data comprises at least a portion of a file used by the program.

14. The method as recited in claim 12, wherein the step of storing the data at the first memory location is performed responsive to determining that the event occurs frequently.

15. The method of claim 12, wherein the data includes an executable program.

16. The method of claim 12, wherein the first memory location is selected for storing the data based on a determination that the first memory location is faster than the second memory location.

17. A non-transitory computer readable storage medium comprising instructions, which when executed by one or more processors cause performance of:
    during and in response to a shutdown procedure of a computer system:
        storing, at a first memory location, data that is (a) stored at a second memory location and (b) to be used during a next boot up procedure of the computer system;
        wherein the first memory location is faster than the second memory location;
        wherein the first memory location and the second memory location are non-volatile memory locations; and
    during the next boot up procedure of the computer system, accessing the data stored at the first memory location.

18. The non-transitory computer readable storage medium as recited in claim 7, wherein the step of storing the data at the first memory location is performed in response to receiving a command for executing the shutdown procedure of the computer system.

19. The non-transitory computer readable storage medium as recited in claim 7, further comprising instructions, which when executed by one or more processors cause performance of:
    subsequent to accessing the data stored at the first memory location during the next boot up procedure of the computer system, over-writing the data stored at the first memory location.

20. The non-transitory computer readable storage medium as recited in claim 7, further comprising instructions, which when executed by one or more processors cause performance of:
    subsequent to accessing the data stored at the first memory location during the next boot up procedure of the computer system, moving the data stored at the first memory location to another memory location different than the first memory location.

21. The non-transitory computer readable storage medium as recited in claim 7, wherein the first memory location is located on a solid state drive.

22. The non-transitory computer readable storage medium as recited in claim 7, wherein storing the data at the first memory location comprises transferring the data from the second memory location to the first memory location.

23. The non-transitory computer readable storage medium as recited in claim 7, wherein the first memory location and the second memory location are the same type of medium.

24. The non-transitory computer readable storage medium as recited in claim 23, wherein the first memory location and the second memory location are on the same medium.

25. The non-transitory computer readable storage medium as recited in claim 7, wherein the first memory location is selected for storing the data based on having been determined to be faster than the second memory location.

26. The non-transitory computer readable storage medium as recited in claim 7, wherein the data is executable code used during the next boot up procedure.

27. The non-transitory computer readable storage medium as recited in claim 26, wherein the executable code is loaded, from the first memory location, into volatile memory for execution during the next boot up procedure.

28. A non-transitory computer readable storage medium comprising instructions, which when executed by one or more processors cause performance of:
- assigning a classification to data based on a type of event that involves the data;
- prior to occurrence of an event, preparing for the occurrence of the event by:
  - based on the classification, storing, at a first memory location, the data that is (a) currently stored at a second memory location and (b) to be used during the event;
  - wherein the first memory location is faster than the second memory location;
  - wherein the first memory location and the second memory location are non-volatile memory locations; and
- performing the event at least in part by accessing the data stored at the first memory location.

29. The non-transitory computer readable storage medium as recited in claim 28, wherein the event comprises execution of a program and wherein the data comprises at least a portion of a file used by the program.

30. The non-transitory computer readable storage medium as recited in claim 28, wherein the step of storing the data at the first memory location is performed responsive to determining that the event occurs frequently.

31. The non-transitory computer readable storage medium as recited in claim 18, wherein the data includes an executable program.

32. The non-transitory computer readable storage medium as recited in claim 28, wherein the first memory location is selected for storing the data based on a determination that the first memory location is faster than the second memory location.

33. The computer system as recited in claim 32, wherein the executable code is loaded, from the first memory location, into volatile memory for execution during the next boot up procedure.

34. A computer system configured for:
- during and in response to a shutdown procedure of the computer system:
  - storing, at a first memory location, data that is (a) stored at a second memory location and (b) to be used during a next boot up procedure of the computer system;
  - wherein the first memory location is faster than the second memory location;
  - wherein the first memory location and the second memory location are non-volatile memory locations; and
- during the next boot up procedure of the computer system, accessing the data stored at the first memory location.

35. The computer system as recited in claim 34, wherein the step of storing the data at the first memory location is performed in response to receiving a command for executing the shutdown procedure of the computer system.

36. The computer system as recited in claim 34, further configured for:
- subsequent to accessing the data stored at the first memory location during the next boot up procedure of the computer system, over-writing the data stored at the first memory location.

37. The computer system as recited in claim 34, further configured for:
- subsequent to accessing the data stored at the first memory location during the next boot up procedure of the computer system, moving the data stored at the first memory location to another memory location different than the first memory location.

38. The computer system as recited in claim 34, wherein the first memory location is located on a solid state drive.

39. The computer system as recited in claim 34, wherein storing the data at the first memory location comprises transferring the data from the second memory location to the first memory location.

40. The computer system as recited in claim 34, wherein the first memory location and the second memory location are the same type of medium.

41. The computer system as recited in claim 40, wherein the first memory location and the second memory location are on the same medium.

42. The computer system as recited in claim 34, wherein the first memory location is selected for storing the data based on a determination that the first memory location is faster than the second memory location.

43. The computer system as recited in claim 34, wherein the data is executable code used during the next boot up procedure.

44. A computer system configured for:
- assigning a classification to data based on a type of event that involves the data;
- prior to occurrence of an event, preparing for the occurrence of the event by:
  - based on the classification, storing, at a first memory location, the data that is (a) currently stored at a second memory location and (b) to be used during the event;
  - wherein the first memory location is faster than the second memory location;
  - wherein the first memory location and the second memory location are non-volatile memory locations; and
- performing the event at least in part by accessing the data stored at the first memory location.

45. The computer system as recited in claim 44, wherein the event comprises execution of a program and wherein the data comprises at least a portion of a file used by the program.

46. The computer system as recited in claim 44, wherein the step of storing the data at the first memory location is performed responsive to determining that the event occurs frequently.

47. The computer system as recited in claim 44, wherein the data includes an executable program.

48. The computer system as recited in claim 44, wherein the first memory location is selected for storing the data based on a determination that the first memory location is faster than the second memory location.

* * * * *